July 28, 1964   R. H. GARDENER   3,142,716
PROCESS UTILIZING SHUTTLE MOULDS
Filed July 21, 1961   6 Sheets-Sheet 1

Inventor
Reginald H. Gardener
By Stevens, Davis, Miller & Mosher
Attorneys Inventor
Reginald H. Gardener.

July 28, 1964   R. H. GARDENER   3,142,716
PROCESS UTILIZING SHUTTLE MOULDS
Filed July 21, 1961   6 Sheets-Sheet 4

Inventor
Reginald H. Gardener
By Stevens, Davis, Miller & Mosher
Attorneys

United States Patent Office 3,142,716
Patented July 28, 1964

3,142,716
PROCESS UTILIZING SHUTTLE MOULDS
Reginald H. Gardener, Edmonton, Alberta, Canada, assignor to Northwest Industries Limited, Edmonton, Alberta, Canada
Filed July 21, 1961, Ser. No. 125,722
5 Claims. (Cl. 264—272)

This invention relates to a process for injection moulding. More particularly, it relates to a process of forming a moulded casing surrounding a joint between two or more wires. Still more particularly, it is directed to an improvement in moulding methods for providing insulated joints in high tension cables.

Many methods are presently in use for providing protection for joints made in cables and in electrical and electronic wiring. These methods include using a simple mechanical joint protected by insulation in the form of tape, as well as more elaborate methods calling for considerable skill and lengthy processes.

Proposals are now being made to use injection moulding to provide a moulded casing around such joints. The moulded casing would be of materials having characteristics similar to the cable covering. By the use of such injection moulding techniques it will now become possible to perform the moulding operation in situ.

A difficulty of such injection moulding techniques has been that it has been extremely difficult to mould the casing of correct wall thickness. Another difficulty has been the ensuring of the centralization of such joints within this moulding during the injection moulding process.

Accordingly, one feature of the present invention provides for a positive centralization of the joint during the moulding operation.

Another feature of the present invention provides for a positive control of the thickness of the wall of the casing, both in its depth and in its concentricity.

Another feature of this invention provides for the substantial elimination of air entrapment within the insulating casing.

A still further feature of this invention is the provision of a process wherein even a semi-skilled operator may carry out the process and still ensure positive encapsulation.

A still further feature of the present invention is the provision of methods for centralizing a mechanical joint in a high tension cable or the like during an injection moulding cycle.

A still further feature of the present invention is the provision of methods for accurately controlling the thickness of the thermoplastic annulus, or casing, surrounding the joint.

A still further feature of the present invention is, generally, the provision of a rapid, single stage, automatic method for the encapsulation of a cable joint with a thermoplastic material, using either a portable or stationary injection means.

A still further feature of the present invention is the provision of methods of centralizing any longitudinal object of constant cross-section and varying outer configuration, during encapsulation with any required thermoplastic material, while controlling the injection moulding to any required wall thickness or any desired outer shape of the capsule, in a longitudinal plane.

Yet another feature of the present invention is the provision of inexpensive re-usable moulds for use in the present invention wherein the existing moulding pressure is used directly to provide the means for carrying out the present method.

In its broadest sense, the present invention provides a method of moulding which comprises the following steps:

placing a preformed member within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the preformed member extending beyond the confines of said mould; placing a disposable sleeve around said preformed member, said sleeve being adapted to maintain the longitudinally extending preformed member in a coaxial central orientation with the longitudinal axis of said longitudinally extending cavity and being slidable over said preformed member and slidable within the main central zone of said cavity, the face of said sleeve being directed to said entrance means, the sum of the length of a portion of said preformed member which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said preformed member with a casing; and removing said casing from said mould, said sleeve being captive on said preformed member. In more general terms, the basic principle upon which the invention is based involves the use of a sliding sleeve within the mould, the sleeve being traversed along the pre-formed member (e.g. the jointed cable) actuated by the pressure and flow of the thermoplastic material during the injection moulding cycle. The movement of the sliding sleeve contains the pre-formed member (e.g. the cable joint) and automatically centrally locates the member. The wall thickness of the sliding sleeve accurately determines the wall thickness of the plastic insulating material being injected. The frontal area of the sliding sleeve provides the pressure face for the plastic material to act upon.

In one preferred embodiment of this invention, there is provided a method of moulding which comprises: placing a mechanical joint between a pair of insulated wires within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, said insulated wires extending beyond the confines of said mould; placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a casing; and removing said casing from said mould, said sleeve being captive on said wire. By this embodiment there is provided means to mould, by injection moulding, thermoplastic materials of a kind which are compatible with the original insulating material surrounding the wire. Since the casing thus injection moulded is compatible with the original insulating material, a molecular bond between the casing and the original insulating material ensues.

In another preferred embodiment of this invention there is provided a method of moulding which comprises: placing a mechanical joint between a pair of insulated wires within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the insulated wires extending beyond the confines of said mould; placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a primary casing; removing said primary casing from said mould, placing said wires and said primary casing within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, said wires extending beyond the confines of said mould; placing a disposable sleeve around said primary casing, said sleeve being adapted to maintain the longitudinally extending primary casing in a coaxial central orientation with the longitudinal axis of said longitudinally extending cavity and being slidable over said primary casing and slidable within the main central zone of said cavity, the face of said sleeve being directed to said entrance means, the sum of the length of a portion of said primary casing which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said primary casing with an exterior casing; and removing said exterior casing from said mould, said sleeve being captive on said wire. By this embodiment, there is provided a method of applying layers of thermoplastic materials of selected physical, electrical or mechanical characteristics around a mechanical joint. These layers or annuli can be of dissimilar materials. This provides, for example, an inner annulus, or primary casing, of a thermoplastic material around the uncovered joint to provide the correct electrical insulation. Such casing is surrounded by an outer annulus, or exterior casing, of a thermoplastic material of a type to protect the primary casing and to provide an outer shell to give strength to withstand abrasion or other deleterious effects.

In yet another embodiment of the present invention there is provided a method of moulding which comprises: forming a mechanical joint between each of n wires of an n-wire cable and its corresponding wire of another n-wire cable; sequentially forming a primary casing, each casing around each of said n-joints being of a configuration such that the primary casing mates with an adjacent casing to form a figure of uniform cross section, by placing each joint within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the wires of the cable extending beyond the confines of said mould; placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a primary casing; removing said primary casing from said mould; combining said "n"-primary casings whereby to form a preformed member; placing said preformed member within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, said wires extending beyond the confines of said mould; placing a disposable sleeve around said preformed member, said sleeve being adapted to maintain the longitudinally extending preformed member in a coaxial central orientation with the longitudinal axis of said longitudinally extending cavity and being slidable over said preformed member and slidable within the main central zone of said cavity, the face of said sleeve being directed to said entrance means, the sum of the length of a portion of said preformed member which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said preformed member with an exterior casing and removing said exterior casing from said mould, said sleeve being captive on said wire.

By this embodiment there is provided means of encapsulating a number of wires in a cable, each of the wires having a primary casing therearound after the wires have been mechanically joined, by forming a bundle of the primary casings and, by using a thermoplastic material of a compatible type with the individual casings of each joint, form a cohesive mass molecularly oriented in accordance with the structure of the thermoplastic material used. If the cable has four wires, each primary casing is one-quarter of the bundle which is to be encapsulated, and so each primary casing has a square cross-section. On the other hand, if the cable has six wires, each primary casing is one-sixth of the bundle which is to be encapsulated, and so each primary casing has a cross-section equal to one-sixth of a sector of a circle.

In another embodiment of this invention a method is provided which comprises placing a mechanical joint between a pair of insulated wires within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the insulated wires extending beyond the confines of said mould; placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a primary casing; removing said primary casing from said mould; surrounding said primary casing with a metal shield whereby to form a preformed member; placing said preformed member within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the wires extending beyond the confines of said mould; placing a disposable sleeve around said preformed member, said sleeve being adapted to maintain the longitudinally extending preformed member in a coaxial central orientation with the longitudinal axis of said longitudinally extending cavity and being slidable over said preformed member and slidable within the main central zone of said cavity, the face of said sleeve being directed to said entrance means, the sum of the length of a portion of said preformed member which it is desired to encapsulate and the length of said disposable sleeve being equal to the length of said cavity; injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said preformed member with an exterior casing; and removing said exterior casing from said mould, said sleeve being captive on said wire. In this embodiment there is provided an insulated joint which may be used in electronic equipment in which the cable should possess a metal shielding therearound.

In a still further embodiment of this invention there is provided a mould comprising: a split stationary mould section of uniform internal diameter, the external diameter of its terminal portion being smaller than the external diameter of its main portion; a split movable mould section, mating with said stationary mould section, the internal diameter of its terminal portion being slightly larger than the external diameter of the terminal portion of said stationary mould section, whereby there is sliding engagement therebetween, and the remaining portion of said sliding split mould having an internal diameter smaller than the internal diameter of its terminal portion, said smaller internal diameter being substantially the same as the internal diameter of said stationary mould section; and an aperture, communicating from the exterior of said movable mould section to the larger internal diameter terminal end thereof whereby thermoplastic material may be injected into said mould, the aperture preferably being located at a point adjacent the smaller internal diameter portion of said movable split mould.

In drawings which illustrate embodiments of the present invention.

Figure 1:
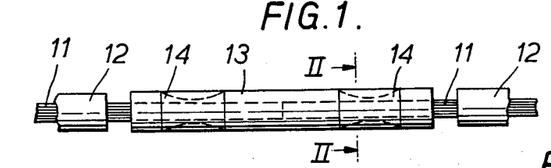
FIG. 1 is a side view of a preferred mechanical joint for use with the present invention.
Figure 2:
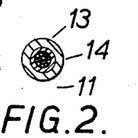
FIG. 2 is a cross-section along the line II—II of FIG. 1.

Turning first to FIGS. 1 and 2, it is seen that the two wires being joined, 11, have their insulation 12 removed from the ends to be joined and are then placed end-to-end. A metal ferrule 13 is placed over the joined ends and is then swaged, as at 14, to make a rigid mechanical joint.

Figures 3, 4:
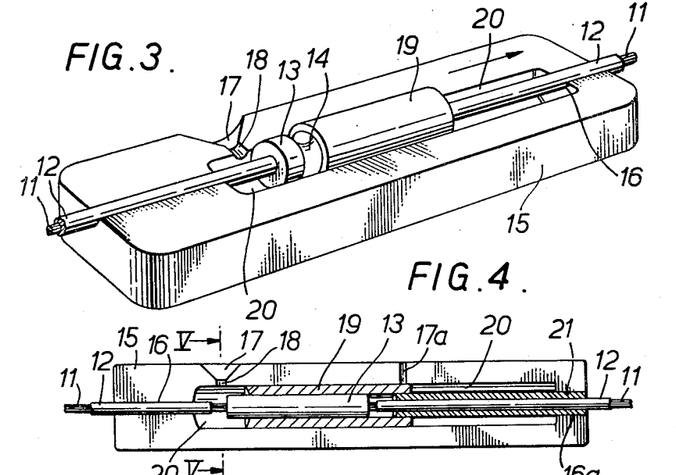
FIG. 3 is a perspective view showing a half mould with a single sliding sleeve for effecting the process of the present invention.
FIG. 4 is a side view, partly in cross-section of a mould with a single sliding sleeve and support for effecting the process of the present invention.
Figure 5:
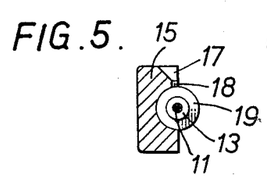
FIG. 5 is a cross-section along the line V—V of FIG. 4.

As seen in FIG. 3, the mechanical joint has a single sliding sleeve 19 placed therearound. The internal diameter of sleeve 19 is slightly greater than the external diameter of the ferrule 13 permitting the sleeve 19 to slide, unhindered, thereover. The sleeve is smaller in length than the length of the cavity in the split mould. The difference between the length of the cavity and the length of the sleeve controls the total length of the capsule formed over the mechanical joint.

The unit is then placed in a split mould, one half of which is shown at 15. The half mould 15 is provided with semicylindrical grooves 16 into which the insulation 12 of wire 11 fits and which grooves tightly grip such insulation and wire. The entry to the mould is provided by funnel shaped inlet 17 and inlet hole 18. The sleeve is oriented so that its face is adjacent, but to the right, as shown in the drawing, of the inlet hole 18. The mould is also provided with a recessed portion 20, of internal diameter just slightly greater than the external diameter of the sleeve 19, permitting sleeve 19 to slide within such recess, in the direction shown by the arrow. The mould is provided with an air bleed hole 17a, whose function will be described hereinafter.

A manner of carrying out a process according to the present invention and the product formed by carrying out a process according to the present invention is shown in FIGS. 4, 5, 6, 7 and 8. The wires 11 joined by the ferrule 13 and having the sleeve 19 slidable thereon are placed in the mould 15 with the groove 16 tightly gripping one of the insulations 12 of the wire 11. In this particular case the ferrule 13 has a larger diameter than the insulation 12 of the wire. Accordingly, a further sleeve 21 is provided, which grips the insulation 12 of wire 11. The external diameter of sleeve 21 is just slightly less than the internal diameter of sleeve 19, and is approximately the same as the external diameter of the ferrule 13. A further cylindrical groove 16a tightly grips sleeve 21, and hence also insulation 12 of wire 11.

Figure 6:
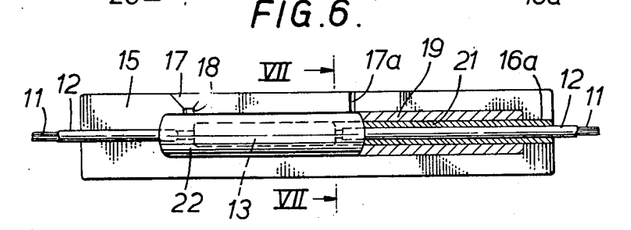
FIG. 6 is a side view, partly in cross-section, of a mould with a single sliding sleeve, after the process of the present invention has been carried out.
Figure 7:
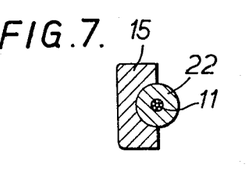
FIG. 7 is a cross-section along the line VII—VII of FIG. 6.
Figures 8, 9, 10, 11, 12:
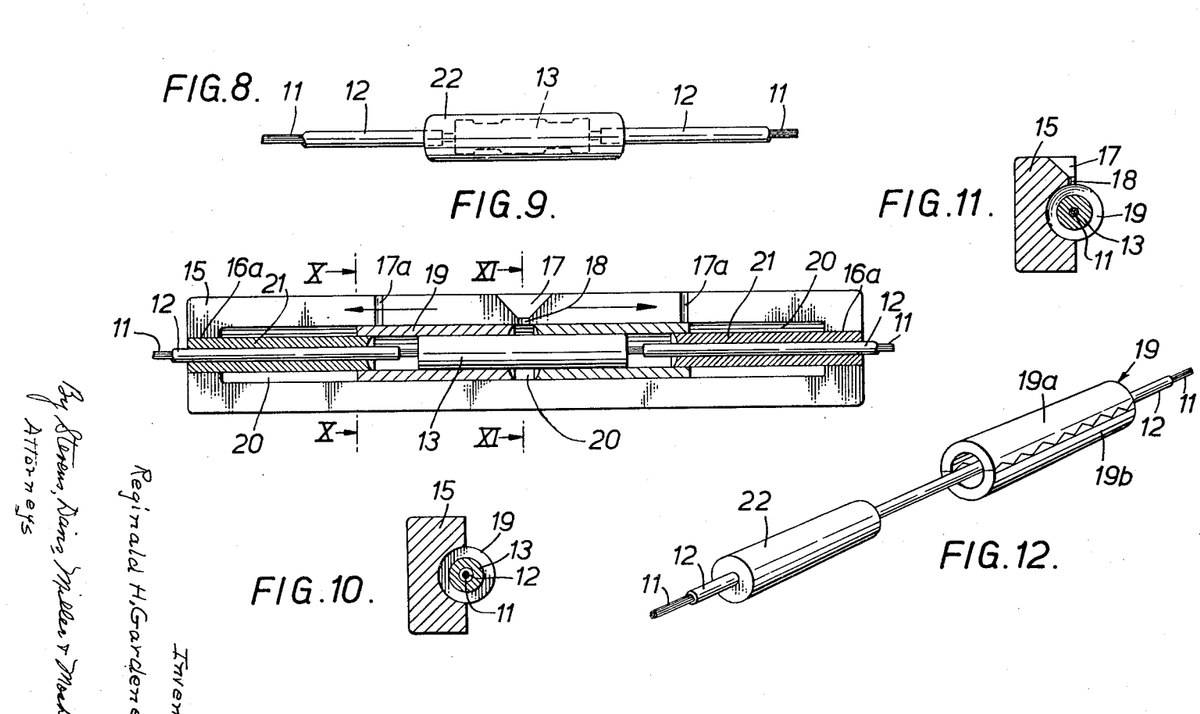
FIG. 8 is a side view showing a completed encapsulated joint according to the present invention.
FIG. 9 is a side view, partly in section, of a mould with a double sliding sleeve, for carrying out the process of the present invention.
FIG. 10 is a cross-section along the line X—X of FIG. 9.
FIG. 11 is a cross-section along the line XI—XI of FIG. 9.
FIG. 12 is a perspective view of a completed encapsulated joint formed by a process of the present invention employing one type of split sliding sleeve.

FIG. 4 shows the orientation of sleeve 19 just prior to the commencing of the moulding process. It is situated adjacent the entry tube 18 of the mould. It will be observed that prior to the injection moulding cycle the ferrule 13 is completely supported, by the walls of recess 20, close to the entry tube 18, where the injected thermoplastic material enters at high pressure and velocity. This support, in turn, prevents, or at least greatly reduces, movement or bending of the wire 11 where it enters the swaged ferrule 13. Prior to commencing the injection of the molten thermoplastic material, the original cable covering is treated with a solvent in order to assure a clean surface. The solvent is selected for the particular type of plastic cable covering and the solvent reacts with such plastic thereby removing any oxidation products of the plastic. This pretreatment assists in the production of a molecular bond between the original plastic cable covering and the thermoplastic material being injected. The fluid thermoplastic material is then injected at high pressure and velocity into the cavity 20 of the mould 15 by means of funnel shaped entry 17 and entry tube 18. The thermoplastic material then fills that part of the recess 20 defined by the wall of the recess and the trailing edge of sleeve 19. The area of the trailing edge of sleeve 19 is chosen so that the pressure of the thermoplastic material will be sufficiently great to overcome the friction between the outer face of sleeve 19 and the walls of recess 20, and between the inner face of sleeve 19 and the outer face of ferrule 13. Thus, continued injection of the thermoplastic material forces the sleeve to slide until, as shown in FIG. 6, the leading edge of sleeve 19 abuts the end wall of recess 20. At this time, the air bleed 17a, which has been sealed off by the sleeve 19, is exposed. Entrapped air is thus permitted to escape, and thermoplastic material also exudes therefore. This gives an indication that the injection moulding operation is completed. The product of this process is shown in FIG. 8, and it consists of a pair of wires 11, each covered with insulation 12, a joint maintained by a ferrule 13 which is completely encapsulated by a casing 22. It will be seen that, by the process of the present invention, there is achieved centralization of the swaged ferrule 13 within the capsule, such casing being made of thermoplastic material.

By this process, there can be formed an encapsulate cable joint with the same type and class of thermoplastic material being used for the casing as that already encasing the wire cable. Whether the thermoplastic materials are the same or not, the heat generated during the injection moulding of the present invention permits the original cable covering 12 to become at least partially transformed to a plastic state, by the incoming fluid thermoplastic material. This enables the original cable covering 12 to fuse to the new thermoplastic material to form a better cohesive molecular bond with the original cable covering 12. By this invention, then, a joint may be encapsulated in such a way that the casing 22 so formed becomes an actual part of the original cable.

A further embodiment of the invention is shown in FIGS. 9, 10 and 11. In this case the swaged ferrule 13 is too long to permit the injection moulding of the present invention shown by the embodiment of FIGS. 4, 5, 6 and 7 to ensure complete coverage of the joint. The modification of the moulding system of FIGS. 4, 5, 6 and 7 are as follows: Firstly, the funnel shaped entry 17 and the entry tube 18 are placed at the mid point of the mould. Secondly, two slidable sleeves 19 are provided. Thirdly, since the diameter of the ferrule 13 is greater than the diameter of the insulation 12 of both wires, two non-slidable sleeves 21 are provided.

At the commencement of the injection moulding cycle, the portion of the recess 20 bounded by the walls of the recess and by the trailing edges of each of the slidable sleeves 19 is filled with thermoplastic material. Further injection of thermoplastic material forces slidable sleeves 19 to move in the directions shown by the arrows until at the end of the process, the leading edges of the slidable sleeves 19 abut the end walls of recess 20, as shown by exuding of the thermoplastic material through air bleed 17a.

Figures 13, 14:
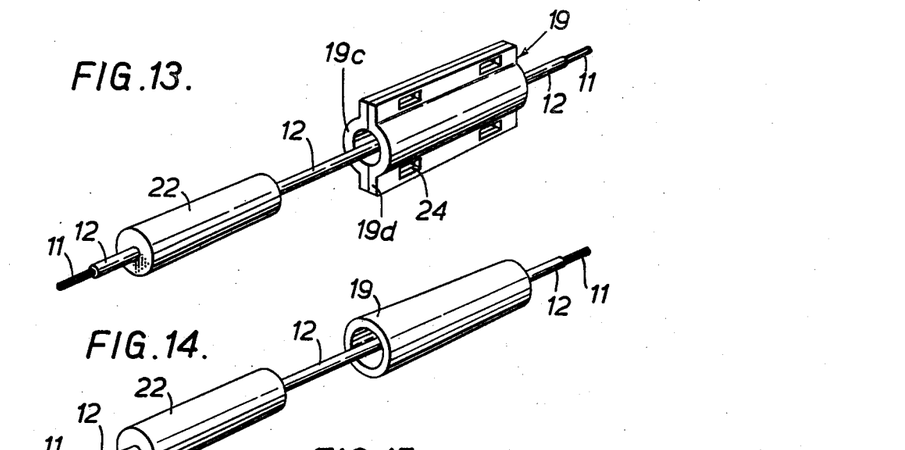
FIG. 13 is a perspective view of a completed encapsulated joint formed by a process of the present invention employing a second type of split sliding sleeve.
FIG. 14 is a perspective view of a completed encapsulated joint formed by a process of the present invention employing a unitary sliding sleeve.
Figure 15:
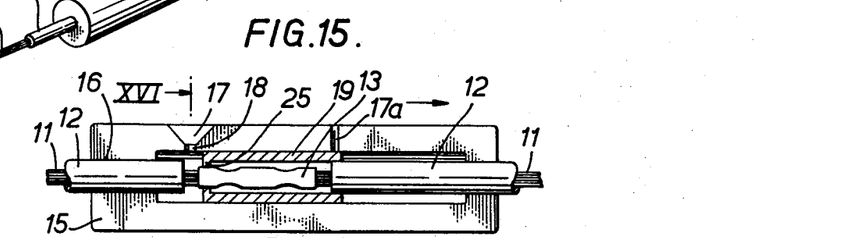
FIG. 15 is a side view, partly in section of a mould and a single sliding sleeve for effecting the process of the present invention where the mechanical joint is smaller in diameter than the original covered cable.
Figure 16:
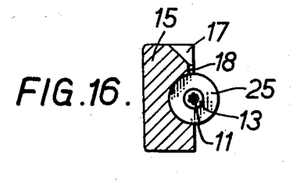
FIG. 16 is a section along the line XVI—XVI of FIG. 15.
Figure 17:
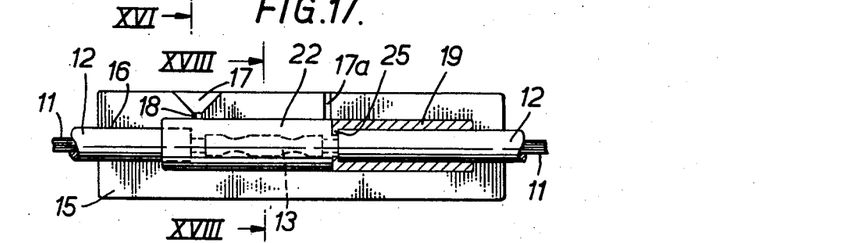
FIG. 17 is a side view, partly in section of a mould and single sliding sleeve after effecting the process of the present invention where the mechanical joint is smaller in diameter than the original covered cable.
Figure 18:
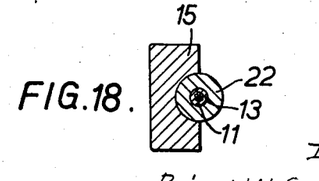
FIG. 18 is a cross-section along the line XVIII—XVIII of FIG. 17.

FIGS. 12, 13 and 14 show the product immediately after it has been taken out of the mould. FIG. 12 shows one type of split slidable sleeve, and FIG. 13 shows another type of split slidable sleeve, wherein the sleeve may be removed from the joined wires. The split sleeve 19 of FIG. 12 is formed of two halves 19a and 19b provided with scalloped mating edges, which permits the forming of a smooth cylindrical outer surface.

The split sleeve 19 of FIG. 13 is formed of two halves 19c and 19d provided with abutting ears 23, held together by a simple locking device (not shown) passing through slots 24. This provides a smooth cylindrical inner surface, but cooperating grooves must be provided in the mould 15 to accommodate projections 23. The two ears provide a larger frontal area (area of the trailing edge) for the fluid thermoplastic to act upon. This permits the formation of thinner wall sections of the sliding sleeve 19 for there are cases where the final diameter of the casing will be limited. Removal of the connecting means from slots 24 permits the two halves to be removed from the joined wires.

Where it is not disadvantageous to retain the sleeve on the joined wire, as for instance when it is desired either to identify the date of the joint, or the type or class of joint which has been made, the sleeve may be the captive, unitary sleeve 19 shown in FIG. 14.

It has also been found that when encapsulating a metal connector as applied to a wire or cable of small diameter, the use of the split sleeve 19a and 19b of FIG. 12 or 19c and 19d of FIG. 13 is difficult for the operator to install. Accordingly, for such applications, a sleeve formed of friable material, such as general purpose polystyrene of a brittle nature is used. After the injection moulding is effected, the sleeve may be broken up and discarded.

A further embodiment of the invention comes into play when it is desired to encapsulate a joint on a cable where the ferrule is of less diameter than the diameter of the cable insulation. Such embodiment is shown in FIGS. 15, 16, 17 and 18. Here, the slidable sleeve 19 has an internal diameter slightly greater than the external diameter of insulation 12, permitting slidable movement in the direction shown by the arrow. It is also provided with a frontal portion 25 along the trailing edge, whose internal diameter is just slightly larger than the external diameter of the ferrule 13. This permits the sleeve 19 to slide along the ferrule 13.

Figure 19:
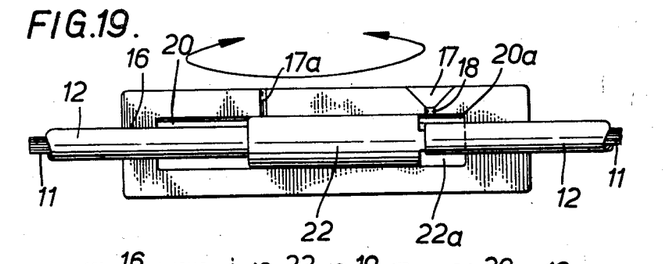
FIG. 19 is a side view, partly in section, of a mould and partly formed capsule for completing the process of the present invention shown in FIGS. 15–18.

At the commencement of the injection moulding the portion of the recess bounded by the top and bottom portions of the mould and the frontal portion 25 of the slidable sleeve 19 is filled with the thermoplastic material. Further injection of the thermoplastic material forces the sleeve to move to the right in the direction indicated by the arrow, when the inside face of the frontal portion 25 abuts the insulation 12, as shown by exuding of the thermoplastic material through air bleed 17a. The capsule is shown as 22, which is seen to have a necked or waisted portion defined by face 25. The encapsulation is then completed as shown in FIG. 19.

The capsule is removed from the mould, and the mould is rotated 180° in a horizontal plane. The encapsulated portion is reinstated in the mould, but the sleeve is not reinstated. The portion of the encapsulated portion within the mould is shown in FIG. 19. The portion 20a of the cavity 20 of the mould is then filled with thermoplastic material by the injection moulding technique, whereby to form a second capsule 22a integral with capsule 22.

As another embodiment of this invention, the process may be used to provide a second type of plastic material over a primary insulation over the wire joint. As one embodiment it may be used in cables which have two or more protective coverings surrounding the wire. The primary covering is usually a material of high electrical characteristics but, in some cases, are of low structural strength. In order to protect and reinforce this covering, a further plastic material is extruded over this. The further material is of a character that possesses the necessary qualities and requirements to provide structural strength and abrasive protection.

Figure 20:
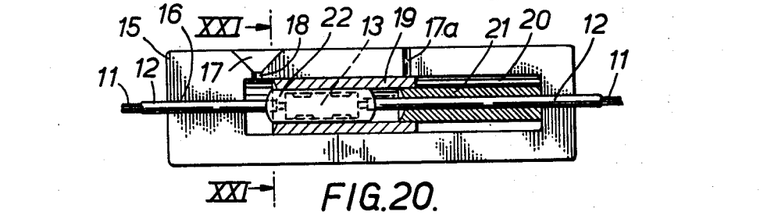
FIG. 20 is a side view, partly in section of a mould and single sliding sleeve for effecting a moulding of a second layer over an already encapsulated joint according to the process of the present invention.
Figures 21, 22, 23, 24, 25:
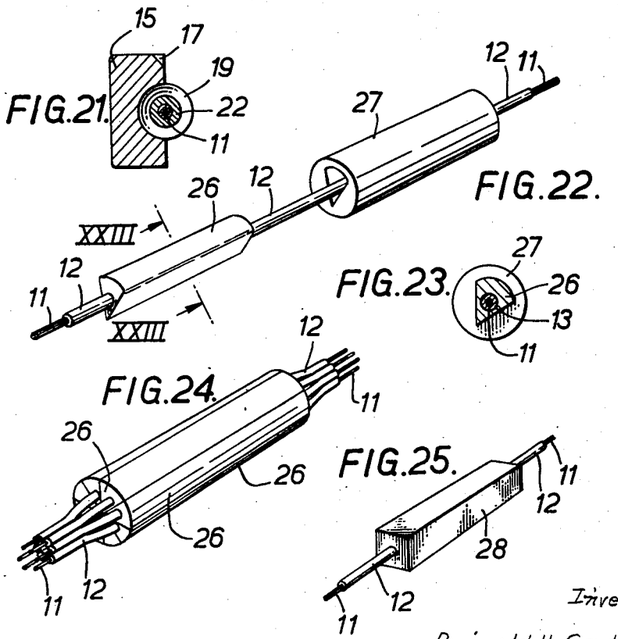
FIG. 21 is a cross-section along the line XXI—XXI of FIG. 20.
FIG. 22 is a perspective view of an encapsulated joint prepared following the teachings of the present invention and designed for forming bundles of a plurality of joined wires.
FIG. 23 is a cross-section along the line XXIII—XXIII of FIG. 22.
FIG. 24 is a perspective view of the primary assembling of six encapsulated joints of FIG. 22, designed for final encapsulation according to the process of the present invention.
FIG. 25 is a perspective view of an alternate encapsulated joint prepared following the teachings of the process of the present invention and designed for forming bundles of a plurality of joined wires.

FIGS. 20 and 21 show the encapsulation of an already encapsulated joint, i.e. a joint already having a casing therearound, such as the one shown in FIG. 8. The encapsulated joint is placed in the mould 15 with the slidable sleeve 19 encircling the capsuled joint 22. The thermoplastic material is injected to the mould cavity through funnel 17 and entrance 18, and the thermoplastic material forces the slidable sleeve to move in the direction shown by the arrow, until the procedure is completed, as shown by exuding of the thermoplastic material through air bleed 17a. This results in the encapsulation of the primary casing and further portions of the cable with a material compatible both with the original wire insulation 12 and with the casing 22.

Numerous incidents occur when it is necessary to form a number of individual joints encapsuled by the method of the present invention, and then a plurality of such casings are formed into a "bundle" and the "bundle" is then encapsuled by the process of the present invention.

Figures 26, 27:
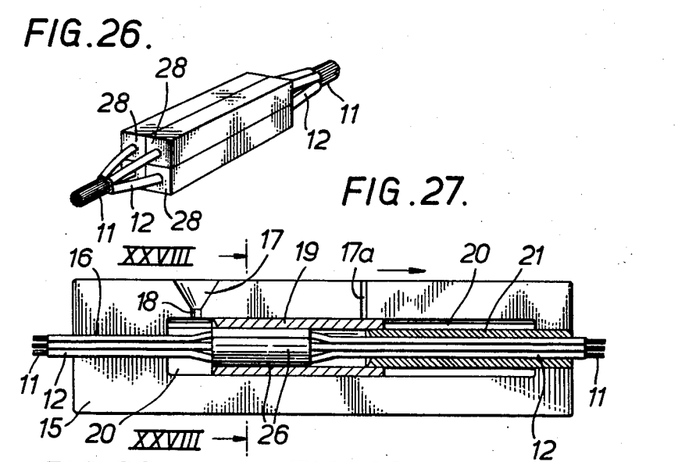
FIG. 26 is a perspective view of the primary assembling of four encapsulated joints of FIG. 25 designed for final encapsulation according to the process of the present invention.
FIG. 27 is a side view partly in section of a mould and single sliding sleeve for encapsulation of the bundle of FIG. 24 according to the process of the present invention.
Figures 28, 29, 30:
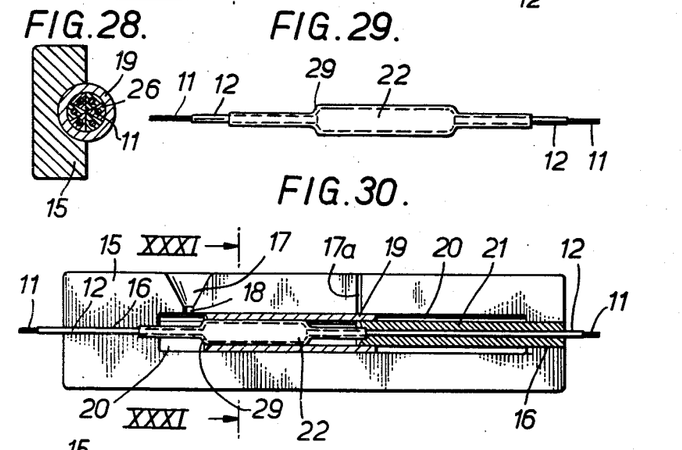
FIG. 28 is a cross-section along the line XXVIII—XXVIII of FIG. 27.
FIG. 29 is a side view of a mechanical joint, sheathed in a metal shield, for use in the process of the present invention.
FIG. 30 is a side view, partly in section of a mould and single sliding sleeve for encapsulation of the joint of FIG. 29 according to the process of the present invention.

FIGS. 22 and 23 show one form of casing, formed by the process of the present invention, which can be formed into a "bundle" and encapsuled by the process of the present invention, while FIG. 25 shows another type. In FIGS. 22 and 23, the slidable sleeve 27 has a cylindrical external shape, but has a one-sixth segment of a circle internal shape. This results in the formation of a casing having a one-sixth circular segment shape. If the internal shape of the slidable sleeve is square, the casing will have a square shape, 28, as shown in FIG. 25. Four of the capsules of FIG. 25 may be combined to form a "bundle" as shown in FIG. 26, which bundle may be further encapsulated. Six of the casings of FIGS. 22 and 23 may be combined into a "bundle" as shown in FIG. 24, and this bundle may be further encapsuled by the process of the present invention, as shown in FIGS. 27 and 28.

The "bundle" as shown in FIG. 24 is placed in the split mould 15, which mould is provided with a primary sleeve 21 around the bundle of insulated wires. The slidable sleeve 19 has an inside diameter slightly greater than the outside diameter of the bundle. Injection of the thermoplastic material into the mould cavity 20 forces the slidable sleeve 19 to move in the direction of the arrow, until the encapsulation is completed as shown by exuding of the thermoplastic material through air bleed 17a. The finally encapsuled joint then does not have the possibility of entrapped air existing between the joined wires.

Figures 31, 32:
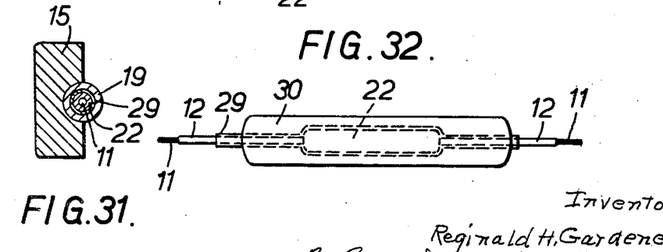
FIG. 31 is a cross-section along line XXXI—XXXI of FIG. 29.
FIG. 32 is a perspective view of the encapsulated joint formed from the mechanical joint of FIG. 30.

It is a requirement of electronic equipment that the cable possess a metal shield. FIGS. 29, 30, 31 and 32 show the application of the process of the present invention in such applications. Turning first to FIG. 29, the joint encased with a casing 22, joining two wires 11 covered by insulations 12 has a braided metal casing 29 placed thereover. The assembly is then placed within the cavity 20 of a split mould 15. The casing is then moulded around the braided metal casing in the manner described hereinbefore. Thus, the thermoplastic material is injected into the mould cavity and forces the slidable sleeve to move in the direction shown by the arrow until the encapsulation is completed, as shown by exuding of the thermoplastic material through air bleed 17a. The completed product is shown in FIG. 32, with the insulation casing 30 covering the central portion of the metal casing, but permits a portion of the metal shielding to be exposed.

Figures 33, 34, 35, 36:
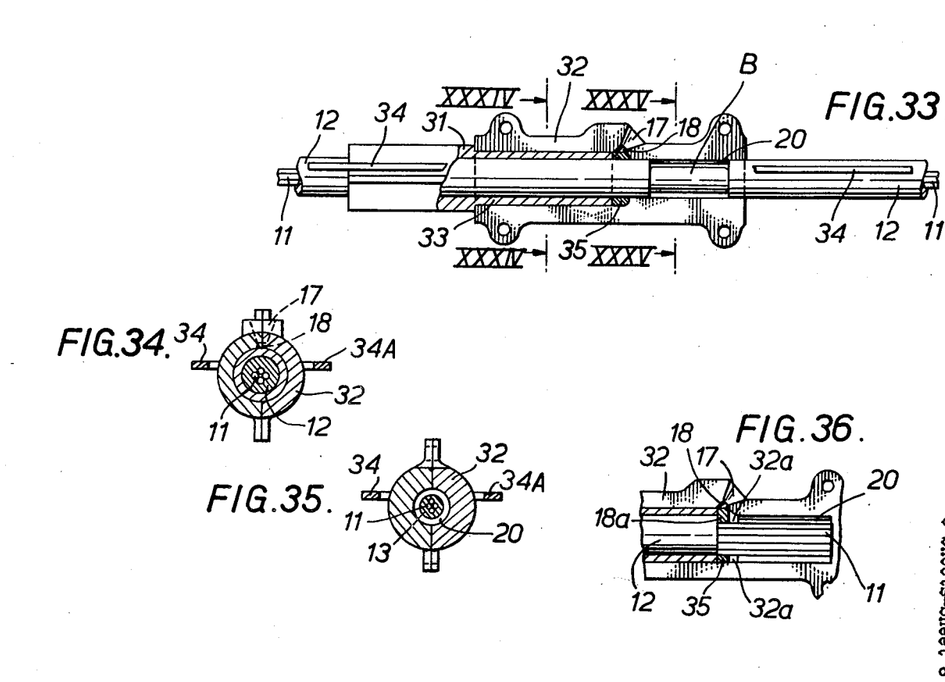
FIG. 33 is a side view, partly in section of a modified mould for carrying out the process of the present invention.
FIG. 34 is a cross-section along the line XXXIV—XXXIV of FIG. 33.
FIG. 35 is a cross-section along the line XXXV—XXXV of FIG. 33.
FIG. 36 is a side view, partly in section of a modified portion of the mould of FIG. 33.

The present invention has been described using a static mould with a slidable sleeve. It is also possible to carry out the present invention using a slidable sleeve which is actually part of the mould. This is shown in FIGS. 33, 34 and 35. The split mould is formed of two sections, a stationary mould 31 and a slidable mould 32, which slides over a portion 33 of stationary mould 31. The internal diameter of stationary mould 31 is just slightly larger than the external diameter of the insulation 12 of wire 11. The two wires to be joined are held together with a ferrule 13. The slidable mould 32 is provided with a funnel shaped entry 17 and entry tube 18. The thermoplastic material 35 is injected by funnel shaped entry 17 and entry tube 18 and the slidable mould 32 is forced by reaction to move in the direction shown by the arrow. The thermoplastic material fills the volume 20 between the slidable mould 32 and the ferrule 13. The movement of the slidable mould 32 is limited by means of stops (not shown) cooperating with ears 34 and 34A.

One advantage of this procedure is that the traversing speed of the slidable mould may be controlled by external pressure thereon. In other words, the speed of the movement can be physically resisted or assisted during the moulding operation.

A mould of this type has an added advantage that where large diameters of splices are being encapsulated, the mould can be done in stages should the volume of the encapsulations be greater than that of the mobile means of plasticizing. Means (not shown) are provided so that the moulding operation can be stopped at any length of travel and a correct moulding obtained.

The mould shown in FIGS. 33–35 may be used, with a slight modification of its structure as shown in FIG. 36, for the replacement of the original insulation around the cable. As shown in FIG. 36, the stationary mould 33 is adapted to grip the original cable insulation 12. The slidable mould is provided with a lip 32a adapted to slide along the wires 11 of the cable. A slot 18a is provided on the slidable mould 32 communicating with entry tube 18 and funnel shaped entry 17 whereby molten thermoplastic material 35 may be brought into contact with the wires 11. The slidable mould is provided with a recessed portion 20, whereby a thickness of thermoplastic material equal to that of the original cable covering is assured. On the completion of the injection moulding a necked or waisted portion remains at the end of the casing. This may be obviated in the manner described hereinabove with reference to FIG. 19.

The invention has heretofore been described with reference to the capsulation of cable joint and the like to form a casing therearound using thermoplastic materials for the casing. However, it is possible to use the features of the present invention for other applications. For example, various other objects may be encapsuled following the teachings of the present invention providing such objects are of longitudinal form and have a constant cross section or at least a cross-section which is adaptable for cooperation with the sliding sleeve.

I claim:
1. A method of moulding which comprises:
 (1) placing a preformed member within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the preformed member extending beyond the confines of said mould;
 (2) placing a disposable sleeve around said preformed member, said sleeve being adapted to maintain the longitudinally extending preformed member in a coaxial central orientation with the longitudinal axis of said longitudinally extending cavity and being slidable over said preformed member and slidable within the main central zone of said cavity, the face of said sleeve being directed to said entrance means, the sum of the length of a portion of said preformed member which it is desired to encapsulate and the length of said disposable sleeve being equal to the length of said cavity;
 (3) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said preformed member with a casing; and
 (4) removing said casing from said mould, said sleeve being captive on said preformed member.
2. A method of moulding which comprises:
 (1) placing a mechanical joint between a pair of insulated wires within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, said insulated wires extending beyond the confines of said mould;
 (2) placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity;
 (3) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a casing; and
 (4) removing said casing from said mould, said sleeve being captive on said wire.
3. A method of moulding which comprises:
 (1) placing a mechanical joint between a pair of insulated wires within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the insulated wires extending beyond the confines of said mould;

(2) placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity;

(3) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a primary casing;

(4) removing said primary casing from said mould;

(5) placing said wires and said primary casing within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, said wires extending beyond the confines of said mould;

(6) placing a disposable sleeve around said primary casing, said sleeve being adapted to maintain the longitudinally extending primary casing in a coaxial central orientation with the longitudinal axis of said longitudinally extending cavity and being slidable over said primary casing and slidable within the main central zone of said cavity, the face of said sleeve being directed to said entrance means, the sum of the length of a portion of said primary casing which it is desired to encapsulate and the length of said disposable sleeve being equal to the length of said cavity;

(7) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said primary casing with an exterior casing; and (8) removing said exterior casing from said mould, said sleeve being captive on said wire.

4. A method of moulding which comprises:

(1) forming a mechanical joint between each of the "n" wires of an "n"-wire cable and its corresponding wire of another "n"-wire cable;

(2) sequentially forming a primary casing around each of said "n"-joints, each primary casing being of a configuration such that each primary casing mates with an adjacent casing to form a figure of uniform cross-section, by (3) placing each joint within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the wires of the cable extending beyond the confines of said mould;

(4) placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity;

(5) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a primary casing;

(6) removing said primary casing from said mould;

(7) combining said "n"-primary casings whereby to form a preformed member;

(8) placing said preformed member within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, said wires extending beyond the confines of said mould;

(9) placing a disposable sleeve around said preformed member, said sleeve being adapted to maintain the longitudinally extending preformed member in a coaxial central orientation with the longitudinal axis of said longitudinally extending cavity and being slidable over said preformed member and slidable within the main central zone of said cavity, the face of said sleeve being directed to said entrance means, the sum of the length of a portion of said preformed member which it is desired to encapsulate and the length of said disposable sleeve being equal to the length of said cavity;

(10) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said preformed member with an exterior casing; and (11) removing said exterior casing from said mould, said sleeve being captive on said wire.

5. A method of moulding which comprises:

(1) placing a mechanical joint between a pair of insulated wires within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the insulated wires extending beyond the confines of said mould;

(2) placing a disposable sleeve around said mechanical joint, said sleeve being adapted to maintain the longitudinally extending mechanical joint in a coaxial central orientation with the longitudinal axis of said longitudinally extending cavity and being slidable over said mechanical joint and slidable within the main central zone of said cavity, the face of said sleeve being directed to said entrance means, the sum of the length of a portion of said mechanical joint which it is desired to encapsulate and the length of said disposable sleeve being equal to the length of said cavity;

(3) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said mechanical joint with a primary casing;

(4) removing said primary casing from said mould;

(5) surrounding said primary casing with a metal shield whereby to form a preformed member;

(6) placing said preformed member within a longitudinally split mould having a cavity defining a main central zone and a pair of terminal zones of lesser diameter providing a stepped cavity therein, said cavity extending along the longitudinal axis of each half of the split mould and provided with entrance means into the main central zone of said cavity, said entrance means being normal to said longitudinally extending cavity and extending from said cavity to the exterior of said mould, the wires extending beyond the confines of said mould;

(7) placing a disposable sleeve around said preformed member, said sleeve being adapted to maintain the longitudinally extending preformed member in a coaxial central orientation with the longitudinal axis of said longitudinally extending cavity and being slidable over said preformed member and slidable within the main central zone of said cavity, the face of said sleeve being directed to said entrance means, the sum of the length of a portion of said preformed member which it is desired to encapsulate and the length of said disposable sleeve being equal to the length of said cavity;

(8) injecting a thermoplastic material into the cavity of said mould, said thermoplastic material being injected in a direction normal to the longitudinal axis of said mould, the force of said injected material being translated through 90° so that said thermoplastic material impinges one end face of said sleeve, whereby to impart axial movement to said sleeve and to encase said portion of said preformed member with an exterior casing; and (9) removing said exterior casing from said mould, said sleeve being captive on said wire.

References Cited in the file of this patent

UNITED STATES PATENTS

| | | |
|---|---|---|
| 925,300 | Coleman | June 15, 1909 |
| 2,368,610 | Fischer | Jan. 30, 1945 |
| 2,403,815 | Martin | July 9, 1946 |
| 2,436,984 | Wilson | Mar. 2, 1948 |
| 2,465,799 | Gravesen | Mar. 29, 1949 |
| 2,501,690 | Prendergast | Mar. 28, 1950 |
| 2,561,351 | Fentress | July 24, 1951 |
| 2,716,623 | Tator | Aug. 30, 1955 |
| 3,070,844 | Warnken | Jan. 1, 1963 |
| 3,072,967 | Mathews et al. | Jan. 15, 1963 |

FOREIGN PATENTS

| | | |
|---|---|---|
| 388,662 | Great Britain | Mar. 2, 1933 |
| 676,543 | Great Britain | July 30, 1952 |